Dec. 24, 1940.    W. P. HERMAN    2,225,632
MOLD CONSTRUCTION FOR CONTACT PLUGS
Original Filed May 21, 1935
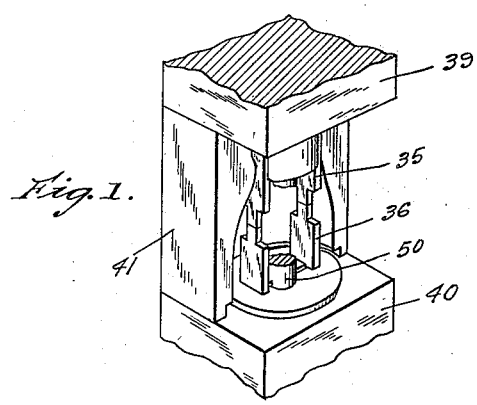
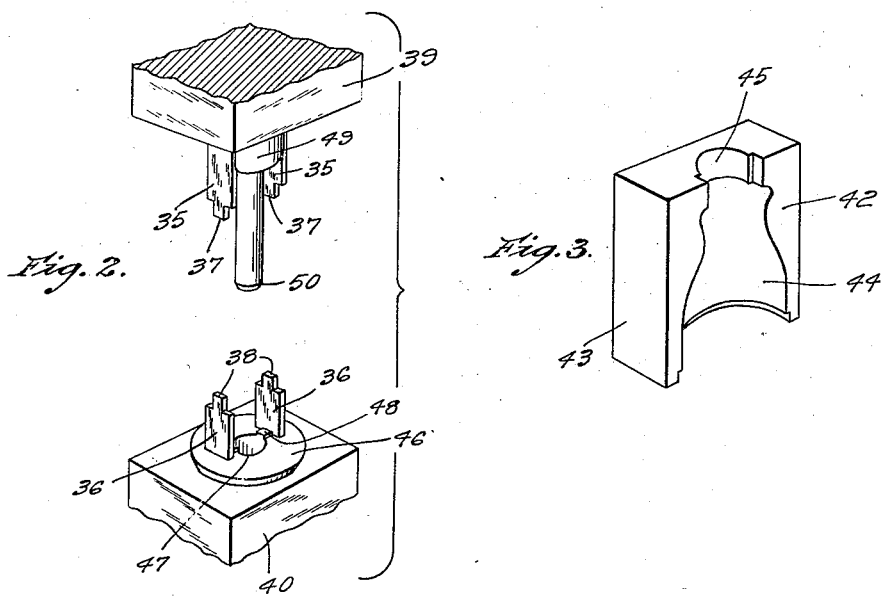
INVENTOR
BY William P. Herman
Nathaniel Frucht
ATTORNEY Patented Dec. 24, 1940

2,225,632

UNITED STATES PATENT OFFICE 2,225,632

MOLD CONSTRUCTION FOR CONTACT PLUGS

William P. Herman, Providence, R. I., assignor to Electrix Corporation, a corporation of Rhode Island Original application May 21, 1935, Serial No. 22,506. Divided and this application July 11, 1936, Serial No. 90,042

4 Claims. (Cl. 18—42)

This application is a division of my copending application, Serial No. 22,506, filed May 21, 1935 for Contact plug, and relates to a mold construction for molding the contact plug disclosed therein.

It is the principal object of my invention to utilize a novel mold construction for obtaining locking recesses in the plug body.

With the above and other objects and advantageous features in view, my invention consists of a novel mold construction more fully disclosed in the detailed description following, in conjunction with the accompanying drawing, and more specifically defined in the claims appended thereto.

In the drawing,

Fig. 1 is a perspective view of the novel molding die in closed position, one half of the cavity die being removed;

Fig. 2 is a perspective view of the novel mold in open position, the cavity die being removed; and Fig. 3 is a perspective view of one half of the cavity die.

It has been found desirable to construct a contact plug which is molded to provide recesses for receiving contact prongs and to lock the prongs in place, the prongs being insertable from either end. I therefore utilize a body mold of standard type, but including spaced tongues in the upper and lower dies which are shaped to contact and form lock recesses in the body, and to move outwardly after the molding operation, whereby prong channels are provided at each end of the plug body.

The plug body is molded in the usual manner, with standard cavity dies; the upper and lower dies are, however, provided with tongues 35, 36 which have stepped ends 37, 38, whereby the tongues permit molding of the intermediate section 23, and are withdrawn as shown in Fig. 2 when the dies are separated.

The outer portion of the mold is of conventional construction and comprises an upper die element 39, a lower die element 40, and an intermediate mold recess or cavity block which for manufacturing convenience preferably comprises complementary half sections 41 and 42. Each section 41 or 42 comprises a rectangular block 43 having a mold recess or cavity 44 on one face corresponding in shape to one half of the plug body 11, the upper end of the recess 44 communicating with an annular collar 45 adapted to fit around the upper die projection hereinafter to be described.

The lower die element 40 is provided with an upwardly extending annular central portion 46 having a central opening 47. The two spaced parallel side parts 36 project upwardly from said central portion 46 on opposite sides of the opening 47, the portion 46 being provided with abutments or blocks 48 extending from the opening to each side part 36. The ends of the side parts 36 are cut out (see Fig. 2) to form end tongues 38 of reduced cross section.

The upper die element 39 is provided with an annular central depending portion 49 having two spaced depending side parts 35 which terminate in the end tongues 37 of reduced cross section similar to the lower die side parts 36, and in alignment therewith. Although it is preferred to have both sets of spaced side parts with reduced end tongues, only one set of side parts may be provided with said end tongues, if desired. The central depending portion 49 is provided with a depending annular extension 50 aligned with the lower opening 47.

When the die is closed, see Fig. 9, the extension 50 enters the opening 47 and aligns the die elements and forms the central cable passageway 18 of the plug. The depending portion 49 forms the upper cable recess of the plug, and the portion 46 forms the lower base recess of the plug, the abutments 48 forming the wire channels. The depending and projecting side parts 35 and 36 align to form the slot passageways, the reduced portions 37 and 38 forming restricted slot portions with shoulders. The cut-out ends 37 and 38 permit removal of the dies after the molding of the restricted slot portions intermediate the ends of the slots.

The mold recess or cavity is shaped to mold the outside of the plug, which may be of any desired form or size.

The plug body is thus readily molded of resilient material such as soft rubber or the like, the contact blades being readily inserted into the slots and therein locked in place. The novel mold construction is inexpensive to manufacture, is readily assembled, and permits easy molding in one operation of the entire plug base with all passageways and lock shoulder portions.

The plug body is thus readily molded of resilient rubber or the like, and the contact prongs are readily inserted and when inserted are locked in place. The novel construction is inexpensive to manufacture, is readily assembled, and the prongs cannot become loose or withdrawn when subjected to ordinary use.

Although I have described a specific mold construction and a specific molding operation, it is obvious that changes in the mold construction and in the method used may be made to suit the requirements for different contact plug designs, without departing from the spirit and the scope of the invention as defined in the appended claims.

I claim:

1. In a molding die construction for electrical contact plugs, a recessed lower die element having a set of two spaced die parts projecting upwardly from the recess base, and a complementary recessed upper die element having a downwardly extending central portion, and two side parts extending downwardly therefrom, said side parts terminating in two spaced ends adapted to align with and contact the ends of the first set of die parts when the molding die is closed.

2. In a molding die construction for electrical contact plugs, a recessed lower die element having a set of two spaced die parts projecting upwardly from the recess base, and a complementary recessed upper die element having a downwardly extending central portion, and two side parts extending downwardly therefrom, said side parts terminating in two spaced ends adapted to align with and contact the ends of the first set of die parts when the molding die is closed, the ends of at least one set of die parts being of reduced cross-section.

3. In a molding die construction for electrical contact plugs, a lower die element having a set of two spaced die parts projecting upwardly therefrom, and a complementary upper die element having a downwardly extending central portion, and a set of two side parts projecting downwardly from said central portion, said side parts terminating in two spaced ends adapted to align with and contact the ends of said first set of projecting parts when the molding die is closed.

4. In a molding die construction for electrical contact plugs, a lower die element having a set of two spaced die parts projecting upwardly therefrom, and a complementary upper die element having a downwardly extending central portion, and a set of two side parts projecting downwardly from said central portion, said side parts terminating in two spaced ends adapted to align with and contact the ends of said first set of projecting parts when the molding die is closed, the ends of at least one set of said projecting parts being of reduced cross-section.

WILLIAM P. HERMAN.